(No Model.) 2 Sheets—Sheet 1.
C. A. ERLANDSON.
SAW SETTING AND FILING MACHINE.
No. 454,679. Patented June 23, 1891.
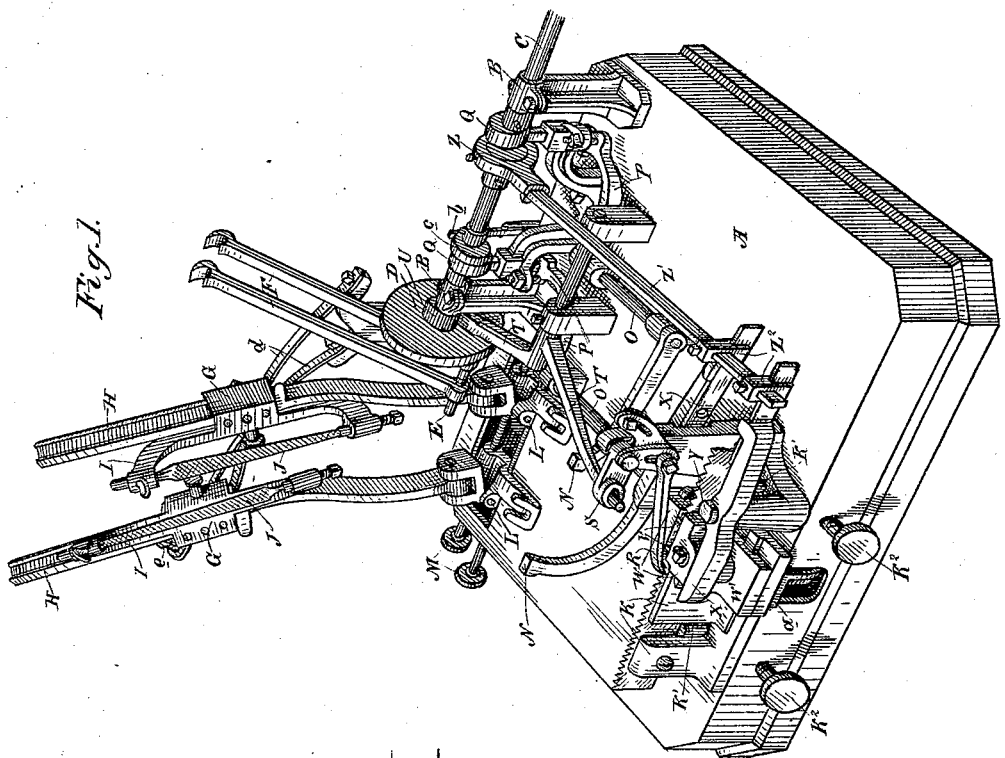
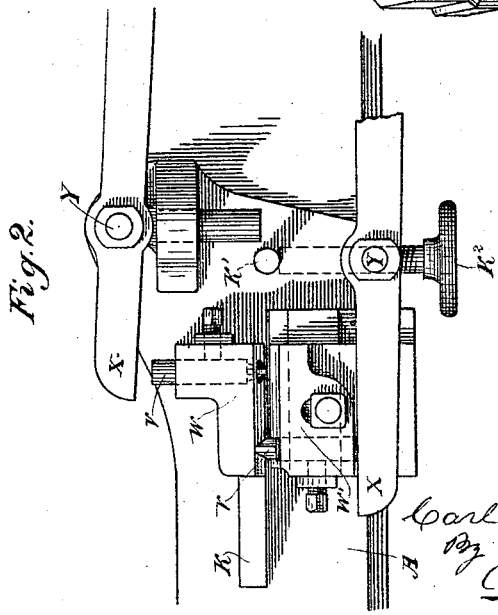
Witnesses,
Inventor,
Carl A. Erlandson
By Dewey & Co.

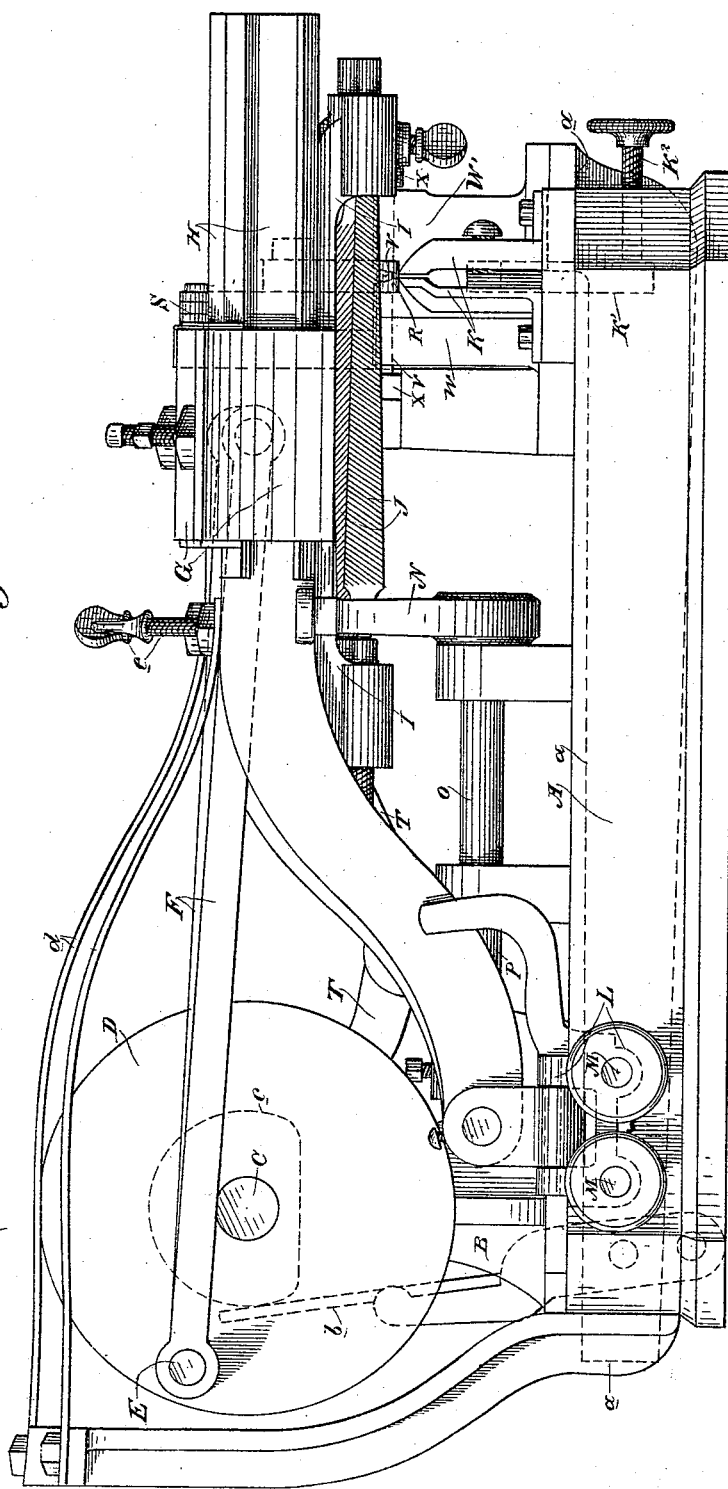

UNITED STATES PATENT OFFICE.

CARL A. ERLANDSON, OF SAN FRANCISCO, CALIFORNIA.

SAW SETTING AND FILING MACHINE.

SPECIFICATION forming part of Letters Patent No. 454,679, dated June 23, 1891.

Application filed February 4, 1891. Serial No. 380,193. (No model.)

*To all whom it may concern:*

Be it known that I, CARL A. ERLANDSON, a citizen of Sweden, residing in the city and county of San Francisco, State of California, have invented an Improvement in Saw Setting and Filing Machines; and I hereby declare the following to be a full, clear, and exact description of the same.

My invention relates to an improved machine for setting and filing saws.

It consists in certain details of construction, which will be more fully explained by reference to the accompanying drawings, in which—

Figure 1 is a perspective view of my machine, the files and guides being thrown back. Fig. 2 is a plan view of the saw supporting and setting part of the machine. Fig. 3 is a side elevation of the same, the parts being shown in working position.

A is the bed-plate, having upon one side of it the standards B, with suitable journal-boxes, in which turns a shaft C. Power may be applied to rotate this shaft by means of pulley, gear, or other suitable attachment, and through the rotation of this shaft the devices necessary for the work will be operated. Upon one end of the shaft is a crank-wheel D, carrying a crank-pin E, and connecting-rods F from this crank-pin are made to hook over pins upon the slides G, which reciprocate upon the guides H. The slides G have arched yokes I extending downwardly from them, and these yokes are adapted to receive and hold the files J, by which the teeth of the saw are to be filed. In the present case I have shown two of these sliding file-holders, and the files are set in them, so that one cuts in one direction and the other in the opposite direction. Beneath the line of these files and at the opposite side of the bed-plate from the crank-shaft C are fitted the guiding-jaws K, in which the saw-plate is placed with the teeth uppermost.

K' are posts or supports upon which the back of the saw rests, and these posts are adjusted up or down to suit the taper of the saw-blade, and so that the toothed edge will be horizontal. The posts K' are secured, when adjusted, by set-screws K². The saw is so arranged with relation to the files that the latter may be drawn across the teeth of the saw as they are caused to reciprocate by the motion of the crank-shaft, as before described.

In order to adjust the guides so that the files will fit saw-teeth of any size, the rear ends of the arms carrying the guides are hinged to swivel-sockets, as shown at L, and these sockets have screws M passing through them horizontally, so that by turning the screws the sockets may be moved nearer to or farther from each other, and by this movement the guides, the slides, and the files will be correspondingly moved. This connection also enables the operator to lift up and disconnect either or both of the file-guides and their operating-arm.

As each file is intended to cut in one direction only, it is necessary to raise the file after it has made its cut, so that it will be drawn back out of contact with the saw. This is effected by means of crank-arms N, fixed upon shafts O, which are journaled upon the bed-plate, and other lever-arms P are fixed to these shafts and extend beneath the driving-shaft C, so as to be alternately engaged by cams Q, which are fixed upon said shaft, and when the shaft is rotated one of these cams will operate its connected lever so as to raise one of the files, while the other is moving forward to make its cut, and then the file which has made the cut will be raised while it is being drawn back and the other will be allowed to descend so as to make its cut.

In order to move the saw forward after each cut, I have shown a pawl R, the point of which engages the teeth of the saw, so as to push the saw forward sufficiently to present new teeth for the operation of the files. This pawl is connected with a rocking plate S, and the rocking plate is operated by levers T and a cam or eccentric U upon the main shaft. In order to adjust the throw of this rocking plate and the pawl, the plate is slotted and the fulcrum-pin of the pawl is adjustable in the slot, so that it may stand nearer to or farther away from the center of oscillation of the plate, and thus diminish or increase the throw of the pawl.

The teeth of the saw are set by means of the bevel-ended pins V, which slide through the blocks W and W', one upon each side of the line of travel of the saw, and each of these blocks has its upper adjacent face inclined, so that the pin moving through the opposite block will bend the point of the saw-teeth against the inclined face of the opposing one. These points are operated alternately by arms X, which are in turn oscillated about their fulcrum-pins Y by an eccentric Z and a connecting-rod Z', uniting it with the levers. The levers are connected with the connecting-rods by heads $Z^2$, which are adjusted upon the rods by set-screws.

During the time when two of the teeth of the saw are being filed and two others are being set by the operation just described the saw will be firmly clamped between the blocks W and W'; but when it is necessary to advance the saw another tooth it is temporarily released by moving the block W' a little way from the block W. This is effected by mounting the block W' upon the end of a sliding bar $a$. This bar slides in suitable guides beneath the bed-plate A, and is operated by a lever $b$, which is fulcrumed upon the bed-plate and has it upper end extending to a point near the shaft C. Upon the shaft C and in line with this lever is a cam $c$, which engages the lever at the proper interval between the movements of the saw-setting and filing cranks or cams, so that when these latter are temporarily out of action the lever and slide will be moved and the clamps opened, and the pawl acting upon the saw will press it forward, after which the clamps are again closed to hold the saw firmly while the next set of teeth are being set and filed.

In order to hold the files properly down to their work and prevent their jumping or chattering, I have shown the spring-arms $d$, fixed to a supporting-standard and having adjusting-screws $e$ in the ends, which press upon the guides upon which the file-carrying slides travel, and thus hold them down to their work.

The whole device is easily adjustable for saws having any sizes of teeth or any depth of blade.

Having thus described my invention, what I claim as new, and desire to secure by Letters Patent, is—

1. In a saw-filing device, the jaws for holding and guiding the saw, the hinged adjustable guides projecting transversely above the saw, slides traveling upon said guides and having yokes or means for holding files which are reciprocated therewith, a driving-shaft and cranks, and connecting-rods uniting said cranks with the reciprocating slides, substantially as herein described.

2. The combination, in a saw-filing machine, of clamps for holding the saw, hinged adjustable guides extending transversely above the saw-blade, file-carrying slides traveling upon said guides, a crank-shaft, crank-connecting rods by which said slides and files are caused to reciprocate, and spring-arms with adjusting-screws adapted to press upon the guides to hold the files down, substantially as herein described.

3. In a saw-filing machine, the saw-holding clamps, the hinged guides extending above the edge of the saw, file-carrying slides and cranks by which the slides are caused to reciprocate upon the guides, and lifting-arms, cranks, and cams upon the main shaft by which said arms are actuated to alternately lift each of the guides when the slides are being withdrawn after the file has made its cut, whereby it is withdrawn out of contact with the saw-tooth, substantially as herein described.

4. In a saw-filing machine, the saw-holding clamps, file-carrying slides, and cranks by which they are reciprocated, hinged guides upon which the slides travel above the edge of the saw, swivel-heads to which the guides are hinged, and screws by which said swivel-heads may be adjusted to or from each other to regulate the position of the files to the teeth of the saw, substantially as herein described.

5. In a saw-filing machine, the saw-holding guides or clamps, file-carrying slides, cranks, and connecting-rods by which they are actuated, guides upon which the slides travel above the line of the saw, and cam-actuated levers by which the files are raised above the teeth of the saw while being withdrawn after making a cut, in combination with the pawl, crank-arms, and cam by which the saw is advanced after each cut, substantially as herein described.

6. In combination with a saw holding and filing device, as herein described, the levers and cam by which the saw is advanced, and the pawl-carrying plate having a radial slot and adjusted nut and pin, whereby the throw of the pawl may be regulated, substantially as herein described.

7. In the saw filing and setting machine, guides within which the saw is supported, file-carrying slides with connecting-rods and crank, and guides upon which the files are reciprocated across the edge of the saw, setting-blocks between which the saw-teeth pass having the inclined opposing faces, the setting-pins having beveled ends adapted to engage the teeth of the saw when they stand opposite the pins, and levers by which said pins are actuated, substantially as herein described.

8. A saw setting and filing apparatus consisting of the guide-jaws between which the saw-blade is placed, reciprocating file-carrying slides traveling above the edge of the saw, setting-blocks having the beveled opposing faces and the setting-pins sliding therein with the reciprocating levers by which said pins are actuated, an arm upon which one of the setting-blocks is fixed, and a lever and cam by which said arm is moved so as to open the jaws and release the saw while the feed mechanism acts to move it forward and by which the jaws are closed to clamp the saw when the setting pins and files are acting upon the teeth thereof, substantially as herein described.

9. In a saw filing and setting machine, the setting-blocks with inclined opposing faces, setting-pins with beveled ends adapted to engage the saw-teeth and bend them in opposite directions, levers engaging and actuating the setting-pins, an eccentric and eccentric-rod, and adjusting-heads and set-screws by which the pin-actuating levers are adjustably connected with the eccentric-rod, substantially as herein described.

10. In a saw filing and setting device, the jaws for holding the saw, the horizontally-moving setting pins and files, in combination with the vertically-adjustable posts or supports for the back of the saw, and the holding-screws, substantially as herein described.

In witness whereof I have hereunto set my hand.

CARL A. ERLANDSON.

Witnesses:
S. H. NOURSE,
J. A. BAYLESS.